United States Patent

Blackham et al.

Patent Number: 5,978,142
Date of Patent: Nov. 2, 1999

[54] IMAGE DISPLAY APPARATUS WITH MODULATORS FOR MODULATING PICTURE ELEMENTS IN AN IMAGE

[75] Inventors: Geoffrey Howard Blackham, Hassocks; Adam Richard Neale, New Haven, both of United Kingdom

[73] Assignee: SEOS Display, Limited, United Kingdom

[21] Appl. No.: 08/922,868

[22] Filed: Sep. 3, 1997

[30] Foreign Application Priority Data

Sep. 11, 1996 [GB] United Kingdom ............. 9619016

[51] Int. Cl.$^6$ ................. G02B 27/10; G02B 9/62
[52] U.S. Cl. ......................... 359/618; 348/758
[58] Field of Search ........................ 359/618, 267, 359/277; 348/758; 353/122

[56] References Cited

U.S. PATENT DOCUMENTS

| | | | |
|---|---|---|---|
| 4,533,215 | 8/1985 | Trias et al. | 350/347 |
| 4,722,593 | 2/1988 | Shimazaki | 349/5 |
| 5,060,075 | 10/1991 | Skinner | 358/250 |
| 5,481,321 | 1/1996 | Lipton | 352/57 |

FOREIGN PATENT DOCUMENTS

| | | |
|---|---|---|
| 0157523 | 10/1985 | European Pat. Off. |
| 0261897 | 3/1988 | European Pat. Off. |
| 0515058 | 11/1992 | European Pat. Off. |
| 0535725 | 4/1993 | European Pat. Off. |
| 0579382 | 1/1994 | European Pat. Off. |
| 01010223 | 1/1989 | Japan |
| 08136887 | 5/1996 | Japan |
| 2195854 | 4/1988 | United Kingdom |
| 2268853 | 1/1994 | United Kingdom |
| 91/15928 | 10/1991 | WIPO |

*Primary Examiner*—Georgia Epps
*Assistant Examiner*—Ricky Mack
*Attorney, Agent, or Firm*—Iandiorio & Teska

[57] ABSTRACT

Image display apparatus comprising projector means, a first modulator and a second modulator, the first and the second modulators being such as to modulate picture elements in an image whereby finite minimum image brightness above true black is reduced, and whereby the contrast range of the projected image is extended.

9 Claims, 6 Drawing Sheets

IMAGE DISPLAY APPARATUS WITH MODULATORS FOR MODULATING PICTURE ELEMENTS IN AN IMAGE

FIELD OF THE INVENTION

This invention relates to image display apparatus and, more especially, this invention relates to image display apparatus for displaying a spatially modulated image.

BACKGROUND OF THE INVENTION

Image display apparatus is used to project visual images for various applications, including entertainment, training, education, public display of information and many others. The image display apparatus may use multiple projectors to produce a single image by the use of two or more projectors producing contiguous images, by the use of two or more projectors projecting partially overlapping images which may be blended to produce an extended continuous image, by the use of a single projector to produce a relatively small image, for example a target image or star field, in a large dark or relatively dark field or in a bright field, or by any other combination of projectors with or without overlap of the projected images.

In such use of projectors it is desirable to achieve consistency in image quality across the total image, and this means controlling at least the color and brightness across the various portions of the resultant image over a wide dynamic range from dark to light. This can be problematic when using projectors with modulators which modulate light, because of the inability of some modulators to achieve extinction, resulting in a finite minimum image brightness, or black level, above true black. When this occurs in image display apparatus employing a single projector, it results in a reduction of the contrast ratio which can be achieved in the resultant image and can result in the production of a 'halo' around the projected image. When it occurs in image display apparatus employing multiple projectors, it can additionally result in the generation of artifacts in the display due to differences in the black level in projectors producing contiguous images, or due to the additive effects of the finite black level in areas in which projected image overlap occurs. If the modulator is a spatially addressed modulator which has defects in some modulator elements, there is the additional possibility of a bright or dark spot or spots in the image.

There are various ways of making projectors for image display systems, and these include, but are not restricted to, cathode ray tubes where the phosphor image is projected via a lens to a viewing screen, spatial light modulators such as liquid crystal light valves and digital mirror devices which are addressed electronically and modulate a high intensity light, and light amplifiers such as an image light amplifier which use a low intensity image to modulate a high intensity light.

The light output from a cathode ray tube projector is a function of the phosphor selected and the energy applied by the electron beam to the screen phosphor. The light output from the light modulator, for example a liquid crystal light valve, is a function of the light input to the modulator, as is the light output from an image light amplifier. Other forms of projector are possible. In general, a projector should have a maximum light output, and an instantaneous or modulated light output which is a function of this maximum value. The variation in light output from minimum to maximum which can be achieved is the modulation range of the projector, and results in a dynamic range of the projected image. If the modulator drive signal is digitally processed or generated, the modulation range of the projector will be represented by a number of bits, and the modulator drive signal will be formed into a number of discrete levels, separated by the least significant bit. This will give a shading resolution limited by the lowest bit of the modulating signal as a function of the maximum brightness which can be displayed.

If it is desired to show part of the display at much reduced brightness, as can happen when displaying a night scene, then only part of the modulation range is used, and the number of levels available to modulate the dark parts of the scene is much reduced, limiting the shading resolution which can be achieved in the darker areas of the display and reducing the amount of detail which can be portrayed in the image as the brightness decreases. A similar truncation in the number of levels which can be displayed also arises when the brightness of a scene is varied to represent the time of day, as, for example, may happen when such a projector is used in a flight training simulator during training for flights extending through dusk or dawn.

Some modulators may have minor faults which degrade the total image quality. An example of such a fault in a liquid crystal light valve display panel is a 'bright pixel', that is a pixel, or picture element, which does not respond adequately to a command to reduce the light output. Such a fault will produce a bright pixel or light spot at a fixed location on the display screen.

Some modulators are unable to produce extinction of the projected light, resulting in a black level which is higher than desirable and introducing artifacts into the display.

The current state of the art in image projectors does not permit the display of negative contrast targets, that is where a target is of a lower brightness than the surround, when producing an image by combining the images formed from separate target and background projectors, and this can result in a lack of realism in some training systems.

SUMMARY OF THE INVENTION

It is an aim of the present invention to obviate or reduce the above mentioned problems.

Accordingly, the present invention provides image display apparatus comprising projector means, a light source, a first modulator, a second modulator, and relay means, the first and the second modulators both being such as to modulate light received from the light source, the first modulator modulating the light to produce an image, the relay means optically relaying the image to the second modulator, the second modulator being such as to further modulate the image to perform optical image enhancement whereby finite minimum image brightness above true black is reduced, whereby contrast range of the projected image is extended, and whereby the optical image enhancement achieved is determined by a driving signal to the second modulator.

The image display apparatus may be such that the first and the second modulators allow the attainment of fine shading resolution in the projected image.

The image display apparatus may be such that the modulated and scanned output image from a projector is relayed on to a spatially addressable modulator panel where it undergoes further modulation on a pixel by pixel basis before being projected to a display screen. The second modulator may apply its full modulation range to its input, which is the already modulated output of the modulator. This produces fine shading in the resultant display, which greatly facilitates the production of the smooth shading functions necessary to blend overlapping images together and produce high quality displays.

The image display apparatus may provide for the use of the full modulation range of a modulator even then the displayed image has a small dynamic range. If the first modulator produces an image by using the full modulation range available, then the second modulator can attenuate this image to produce an image with a reduced dynamic range but with the full modulation resolution. Typical applications include the display of a dark target or the generation of a shadow in the image. The attenuation is applied pixel by pixel and can be non-linear with space and/or video intensity to produce special effects.

The image display apparatus may also provide better control of the black level in a projector system. Some modulator panels do not provide total extinction of the modulated image and when a projector is built using such a panel, the dark background produced can have a level which is not true black but has a finite brightness level, and which causes bands to appear when projector fields overlap in the image due to summation of these low but finite brightness levels. The second modulator used in the image display apparatus of the present invention attenuates the background light level to produce a level which is very close to black.

The image display apparatus may also mitigate modulator defects which generate position related artefacts in the displayed image. If one modulator has a bright pixel which results in that pixel being only partially modulated or not modulated at all, then the entire modulation process for that pixel can be approximated in the other modulator, thus effectively correcting or compensating for this defect.

In one embodiment of the invention, the image display apparatus is one in which the second modulator is driven with an amplified version of the drive signal to the first modulator.

In another embodiment of the invention, the image display apparatus is one in which the first and the second modulators are driven with different functional signals.

In a further embodiment of the invention, the image display apparatus is one in which the functions of the first and the second modulator drive signals are combined for some of the picture elements.

In all aspects of the present invention, the image display apparatus may be one in which the second modulator is spatially addressed.

The second modulator may be placed at a focal plane.

The first and the second modulators may be illuminated with collimated light. The second modulator may comprise a liquid crystal display panel and a polarizing sheet analyzer.

BRIEF DESCRIPTION OF THE DRAWINGS

Embodiments of the invention will now be described solely by way of example and with reference to the accompanying drawings in which.

DESCRIPTION OF THE PREFERRED EMBODIMENTS

Figure 1:
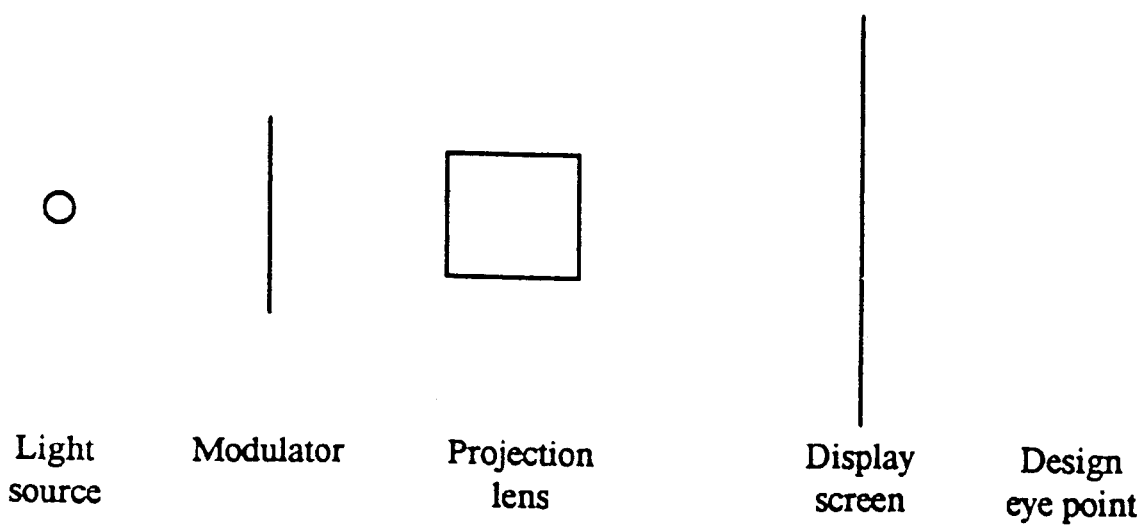
FIG. 1 shows a diagrammatic representation of a projector based display system.

Referring to FIG. 1 there is shown a representative projector based system. A light source illuminates a spatially addressable modulator, for example a liquid crystal light valve, the modulated light output being collected by a projection lens to form an image on a screen, which is viewed from a design eye point. The display screen shown is a back projection screen, but it may also be a front projection screen. The screen may be curved, and the screen may be viewed directly or indirectly via mirrors, collimating mirrors or other viewing devices.

Most scanning display projectors exhibit persistence at the pixel level. Each individual pixel is addressed for a very short time, but continues to give light out for a much longer time. In the case of some liquid crystal light valves, each pixel continues to pass the amount of light to which is has been set until it is set to a new value, which occurs the next time that pixel is addressed. Each pixel thus exhibits memory for the refresh period of the light valve, and the light beam which is projected on to the screen contains light components from some or all of the array of picture elements or pixels which form the picture. For projectors incorporating cathode ray tubes, either for director projection or as the modulation input of an image light amplifier, the cathode ray tube phosphor exhibits persistence, and the light output from a point on the phosphor decays after being excited by the electron beam. The light output from the cathode ray tube face or from the image light amplifier is again composed of components from all or many picture elements.

For a projector of the type illustrated in FIG. 1, the light output representing a defined pixel can only be isolated at a focal plane (the display screen). Thus, in order to only further modulate the light from an individual pixel in a second modulator, the second modulator must either be co-incident with the first modulator where the first modulator is a spatially addressed device like a liquid crystal light valve or image light amplifier, or be superimposed upon the phosphor of a cathode ray tube where this is used for direct projection, or at an intermediate focal plane within the projector system, as shown in FIG. 2, or by integrating it with a first spatially modulated light valve where the incident illumination is collimated, as shown in FIG. 3.

Figure 2:
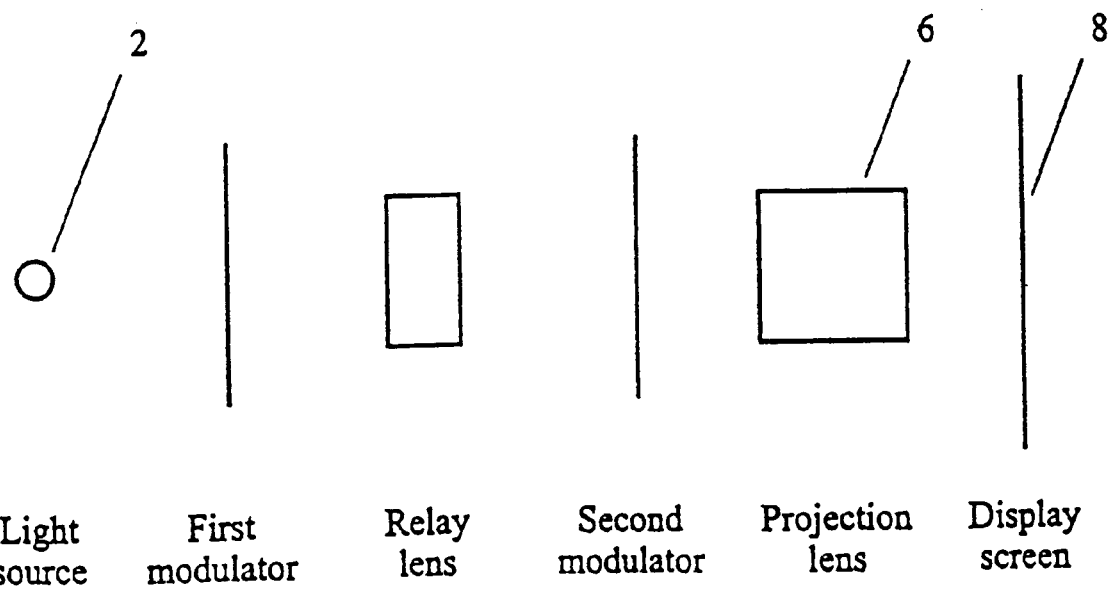
FIG. 2 shows one approach to a two modulator projector.

FIG. 2 shows the equivalent optical path of a dual modulator projector having spatially addressable modulators for both first and second modulators, and with the second modulator being placed in a focal plane. Each element in the first spatially addressable modulator is imaged on to the corresponding element of the second modulator by the relay lens. The incident light from the source is thus modulated at the pixel level by the first modulator and again at the pixel level by the second modulator before being imaged on to the screen by the projection lens.

Figure 3:
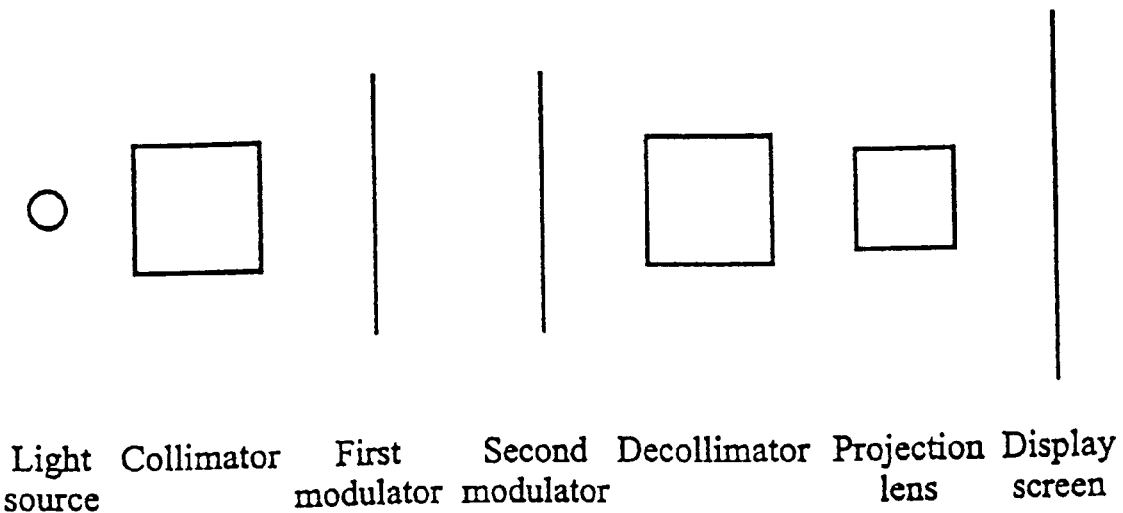
FIG. 3 shows an alternative approach to a two modulator projector.

FIG. 3 shows a diagrammatic view of the equivalent optical path of a two modulator projector suitable for use with a collimated light beam as a source. The first and second modulators are again spatially addressable modulators, and the light from the light source is passed first through a collimator, then through the first and second modulators, and is then decollimated and projected on to the screen. In this embodiment, the spatially addressable elements of the two modulators are aligned along the light path.

In both of these cases, the light representing a given pixel in the image which emanates from the first modulator passes through a corresponding pixel modulator in a second spatially addressed modulator, enabling further modulation to be applied to that pixel. The result on the display screen is a function of the product of the two modulation functions, and is independent of the order in which these modulation functions are applied. Fine shading control of the output is able to be achieved by the use of these two sequential modulators.

Various strategies may be adopted for driving the two modulators. One modulator may be used to produce a fully modulated image and the other modulator may be used to compress the dynamic range of the image, or of parts of the image. Such an approach may be used to present an image in which part of the displayed scene is in shadow, or to produce a blending function for overlapping images.

If one modulator has a bright or dark pixel defect then the combined modulation can be approximated for that specific pixel in the other modulator, with the other parts of the image continuing to undergo partially modulation in each modulator panel.

Figure 4:
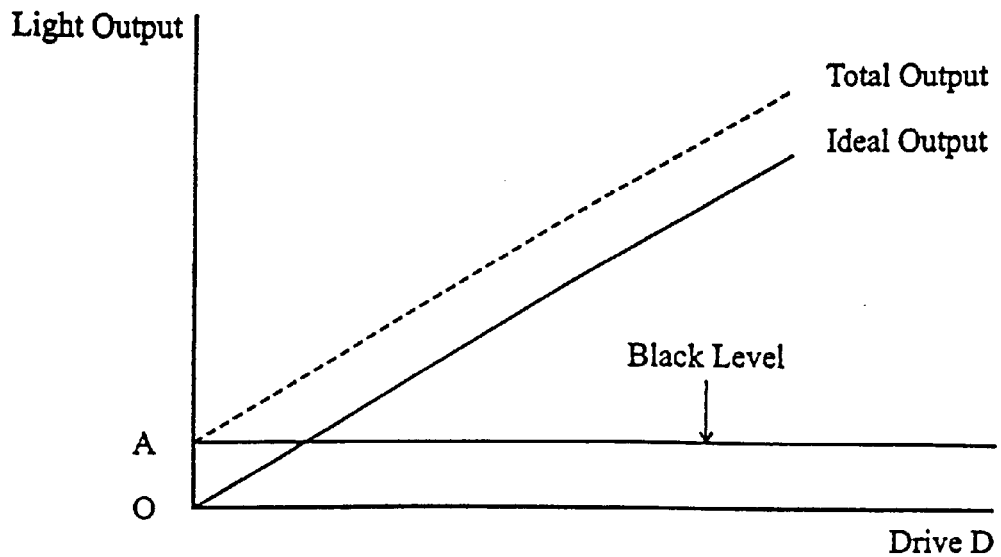
FIG. 4 shows an idealized characteristic of a light modulator.

If extinction is not obtained in a single modulator at zero drive, then the displayed black level will not be true black. FIG. 4 shows an idealized characteristic of a light modulator. The ideal output is linear with drive, and starts at the origin. Also shown is a black level, which represents the finite light passed by the light modulator when it is fully turned off. If the black level is taken to result in a constant output A, the total output will be, as shown by the broken line in FIG. 4, a linear output sitting on a pedestal of magnitude A, where A is a percentage of the light input to that modulator.

Figure 5:
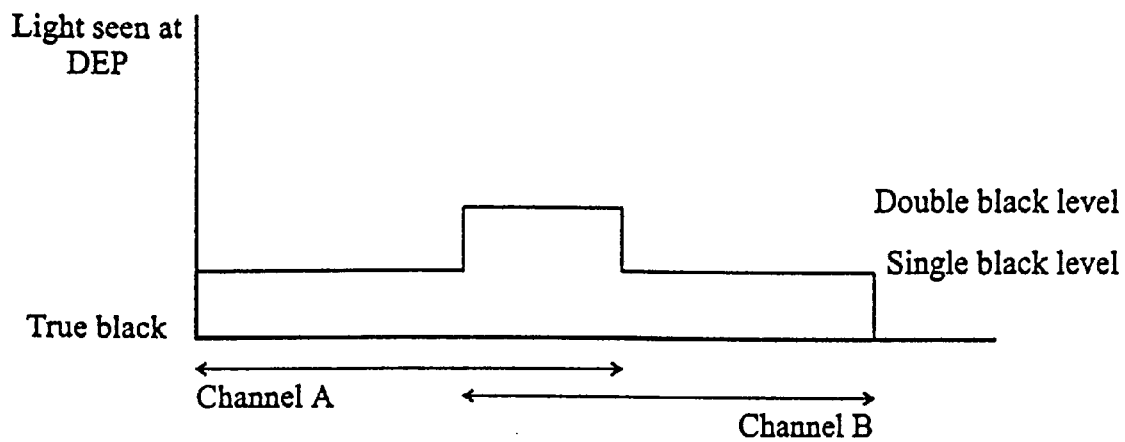
FIG. 5 shows how the black level light output varies across a composite image formed by using two projectors producing overlapping images.
Figure 6:
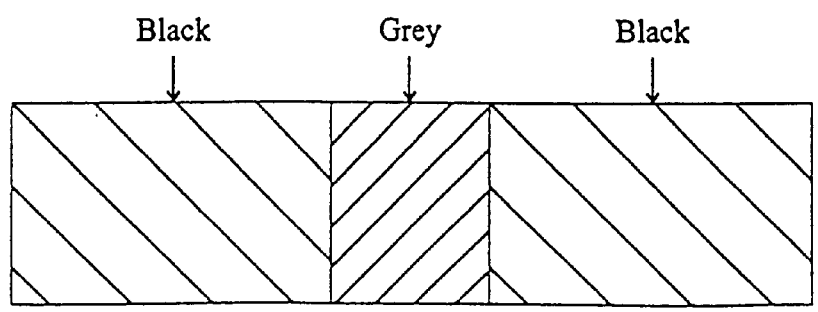
FIG. 6 shows how the black level image will be seen at the design eye point when viewing a composite image formed by using two projectors producing overlapping images.

If two projectors utilizing modulators having the above characteristics are used to illuminate adjacent areas of a screen, and there is overlap in the areas illuminated by each projector, then, with the drive signals set to zero, the light output from each projector will be the black level represented by A in FIG. 4. This results in an illumination profile as shown in FIG. 5, and the resultant image seen from the design eye point will be as shown in FIG. 6.

Figure 7:
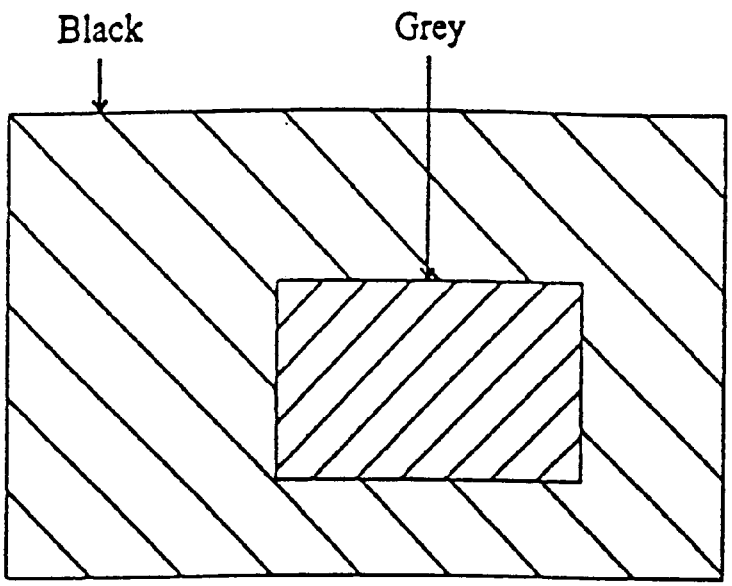
FIG. 7 shows the artifact produced by a non-zero black level when using a single projector to illuminate only part of the display screen.

If a single projector is used, the residual black level illumination will mean that the screen will be illuminated even in the absence of a drive signal. If a single projector is used to illuminate a small part of the total screen to display, for example a target image in a dark field, then the area of the screen into which the image will fall will be apparent even in the absence of a target, as shown in FIG. 7.

It is important that the residual black level be very close to true black level in order to minimize these artifacts in applications where high quality imagery is required. The use of a second modulator will reduce this unwanted light and produce a black level very close to that desired.

If the input light to a modulator is I, the black level A of a modulator is a proportion of the input, and the drive signal is represented by D, then the output L can be described as $$L = A + K_D \times D \times I,$$

or $$L = K_A \times I + K_D \times D \times I,$$
$$= I(K_A + K_D \times D)$$

where $K_A$ and $K_D$ are constants.

If the first and second modulators are indicated by the subscript $_1$ and $_2$ respectively, then the output $L_1$ of the first modulator can be described by $$L_1 = I(K_{A1} + K_{D1} \times D_1)$$

This forms the input to the second modulator, and the output $L_2$ of the second modulator can be described by $$L_1 = I(K_{A1} + K_{D1} \times D_1)(K_{A2} + K_{D2} \times D_2)$$

Now, when $D_1 = D_2 = 0$, the black level, $L_{2BL}$, is given by $$L_{2BL} = I \times K_{A1} \times K_{A2}$$

and is hence much reduced over the case with a single modulator.

Figure 8:
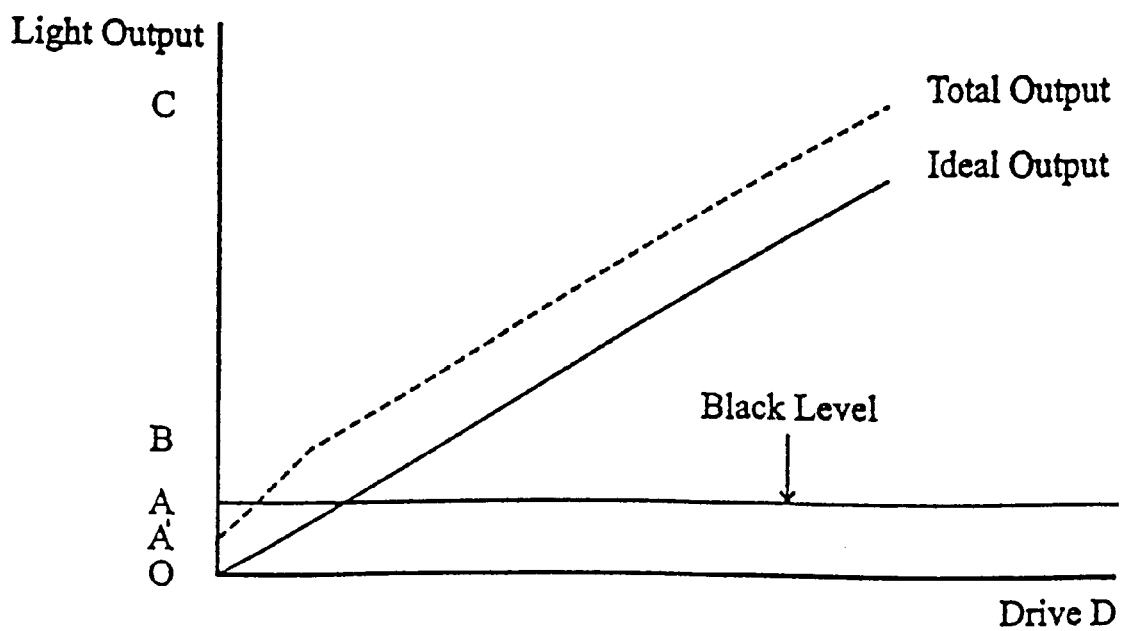
FIG. 8 shows the idealized characteristics of a two modulator system.

A typical output characteristic of a pair of modulators is shown in FIG. 8. The black level has been reduced from A to A'. The light output from B to C is as for a single modulator system, and the output from A' to B is attenuated by the second modulator. The slope of this line is dependent upon the magnitude of the drive signal applied to the second modulator.

As an example of how such a system is implemented in practice, a method will now be described for using two modulators to reduce the brightness of the black level in a light valve projector. The description is based on the use of a spatially modulated liquid crystal light valve, but the methods described above can readily be applied to other forms of imaging projectors.

Figure 9:
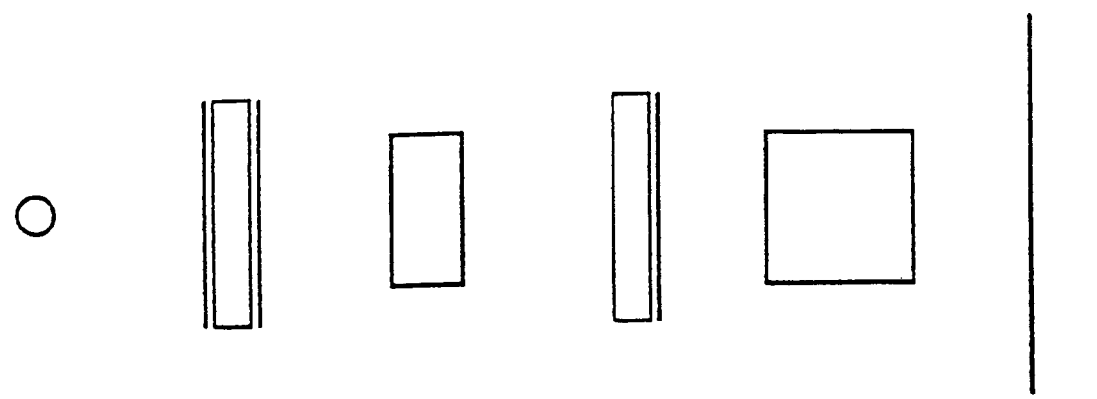
FIG. 9 shows a projector incorporating a light valve and a suppressor.

FIG. 9 shows an arrangement for producing a two modulator projector using liquid crystal light valves as the spatially addressed modulator elements. A light illuminates a liquid crystal light valve (the first modulator), the image of which is relayed by a relay lens to a modified liquid crystal light valve called a liquid crystal display suppressor (the second modulator). The image from the suppressor is projected to the display screen by a projection lens.

Figure 10:
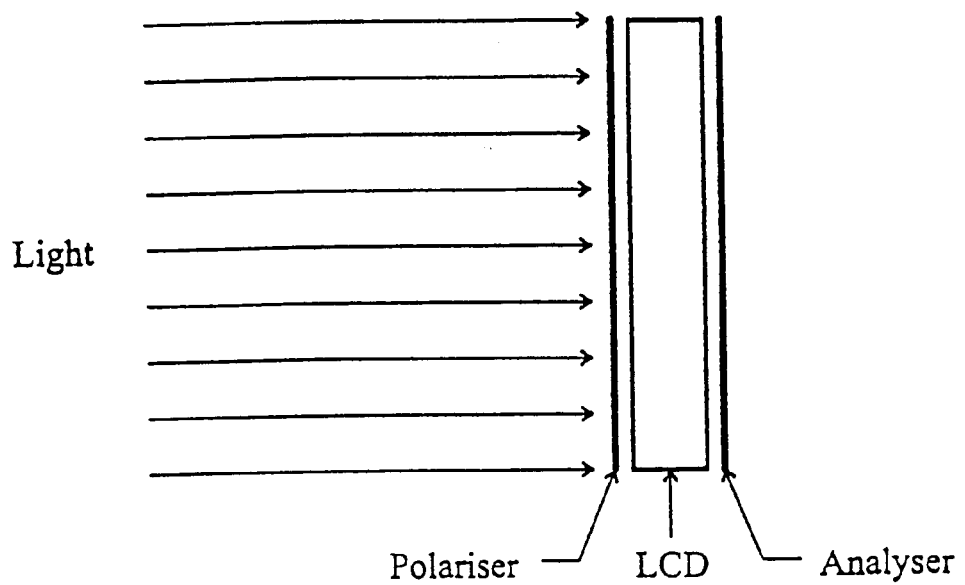
FIG. 10 shows the essential optical components of a liquid crystal light valve.

FIG. 10 shows a typical liquid crystal display light valve, consisting of a liquid crystal display panel sandwiched between two polarizers, with the polarizer on the input side being called the input polarizer and that on the exit side being called the analyzer.

The assembly is illuminated with light which is polarized by the input polarizer. Each element of a liquid crystal display light valve modulates light by rotating the polarization of the light by an angle dependent upon an analogue voltage applied to it, and the resultant rotated polarized light is passed to a second polarizer sheet, usually called an analyzer, which passes a proportion of the polarized light depending upon the relative angles between the planes of polarization of the light output from the liquid crystal display and the plane of polarization of the analyzer sheet. Thus, by varying the analogue voltage drive to an element of the liquid crystal display, it is possible to vary the light output from minimum to maximum.

Figure 11:
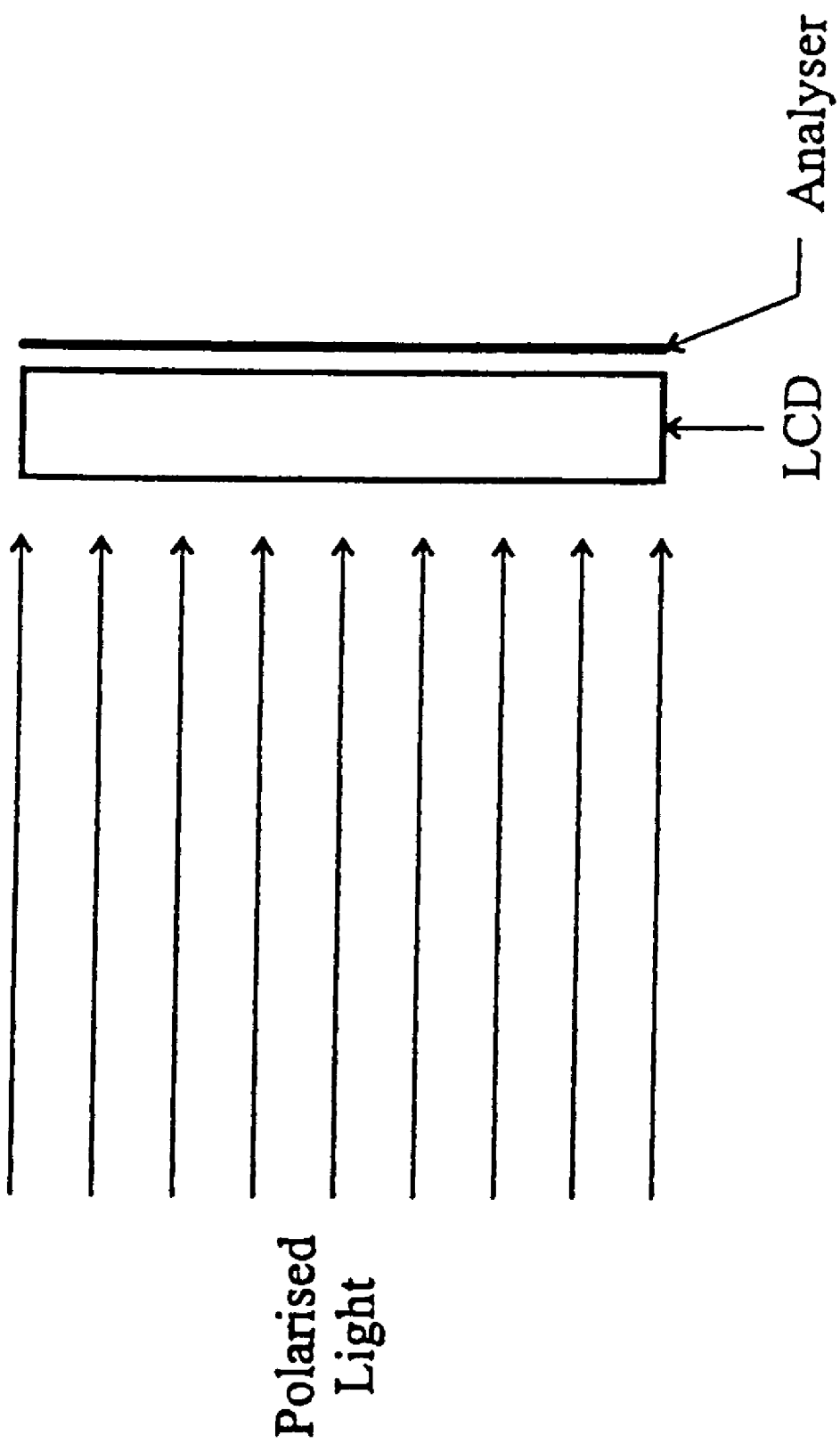
FIG. 11 shows the essential optical components of a liquid crystal suppressor.

FIG. 11 shows a suppressor, a modified liquid crystal display light valve comprising only the liquid crystal display panel and the analyzer. The suppressor will function in exactly the same manner as the light valve described above if it is used with pre-polarized light at the input.

With the projector assembly shown in FIG. 9, the light modulated by the first modulator is plane polarized, so removing the need for an input polarizer on the second modulator. The liquid crystal display and analyzer of the second modulator work in exactly the same manner as those of the first modulator.

Now, referring to FIG. 9, it is assumed that the liquid crystal display light valve has a polarizer which produces vertical polarization, and that the liquid crystal display panel is a normally black device, that is to say there is no rotation of the polarization to produce a black picture element, and the analyzer has horizontal polarization in order to block the unrotated plane polarized light coming from the liquid crystal display panel, then any leakage of light from the light valve under these conditions, the black level, will have the plane of polarization of the analyzer, which in this example is horizontal.

When an analogue drive signal is applied to the liquid crystal display light valve to produce a light output, the output light is again horizontally polarized. Thus the characteristics required of the suppressor are to block the low black level light and pass all other light. If it is assumed that the suppressor liquid crystal display light valve is a normally black device, and that the suppressor analyzer has vertical polarization to give maximum light transmission when the plane of polarization is fully rotated at maximum drive, then, if both the liquid crystal display light valve and the liquid crystal display suppressor are driven with the same analogue drive signal, the black level light output from the light valve when the drive is zero will be maximally attenuated by the suppressor and the modulated light output from the light valve for all non-zero drive levels will be further modulated by the suppressor. The distribution in modulation between the liquid crystal display light valve and the liquid crystal display suppressor can be selected by suitable choice of the relative magnitudes of the drive signals for each. Where the black level leakage from the first modulator contains both horizontal and vertical polarizations, the suppressor will be most effective if it also has both input and analyzer polarizers.

It is to be appreciated that the embodiments of the invention described above with reference to the accompanying drawings have been given by way of example only and that modifications may be made.

We claim:

1. Image display apparatus comprising projector means, a light source, a first modulator, a second modulator, and relay means, the first and the second modulators both being such as to modulate light received from the light source, the first modulator modulating the light to produce an image, the relay means optically relaying the image to the second modulator, the second modulator being such as to further modulate the image to perform optical image enhancement whereby finite minimum image brightness above true black is reduced, whereby contrast range of the projected image is extended, and whereby the optical image enhancement achieved is determined by a driving signal to the second modulator.

2. Image display apparatus according to claim 1 in which the second modulator is driven with a said driving signal which is an amplified version of a drive signal to the first modulator.

3. Image display apparatus according to claim 1 in which functional signals which are different from each other are used to drive the first and the second modulators.

4. Image display apparatus according to claim 1 in which functions of drive signals for the first and the second modulators are combined for some of the picture elements.

5. Image display apparatus according to claim 1 in which the second modulator is one which is matrix addressed.

6. Image display apparatus according to claim 1 in which the second modulator is placed at a focal plane.

7. Image display apparatus according to claim 1 in which the light source illuminates the first and the second modulators with collimated light.

8. Image display apparatus according to claim 1 in which the second modulator comprises a liquid crystal display panel and a polarizing sheet analyzer.

9. Image display apparatus according to claim 1 in which the relay means is a relay lens or direct optical coupling.

* * * * *